G. Schott,
Bed Feathers,
No. 44,223. Patented Sep. 13, 1864.
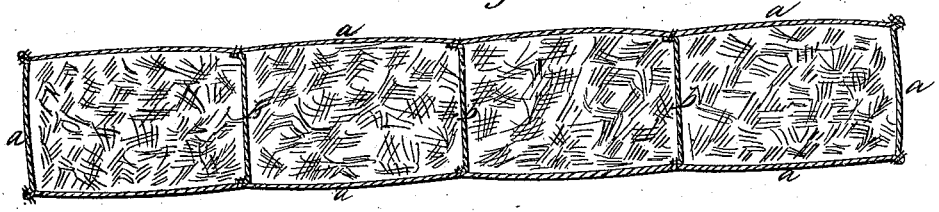
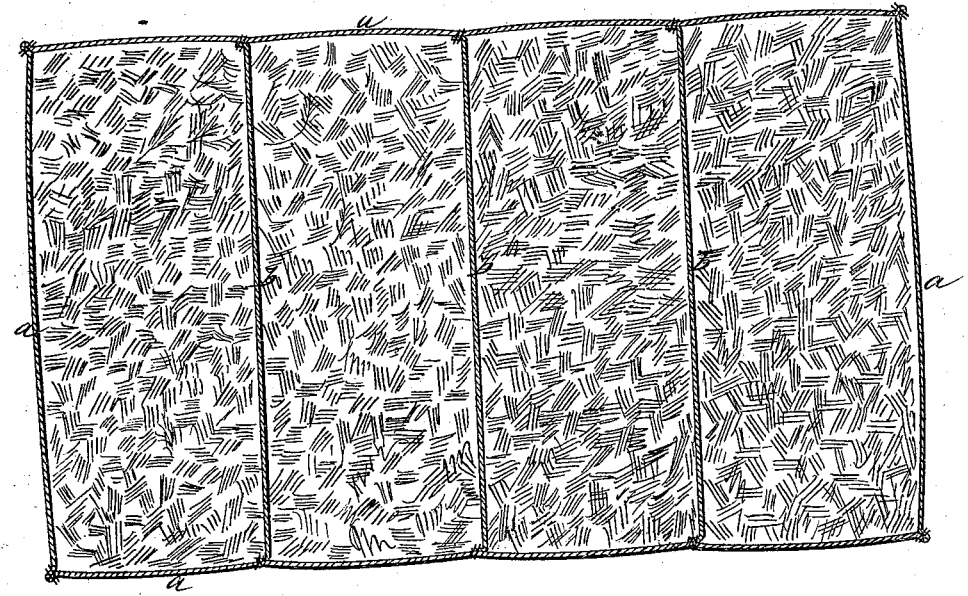
Witnesses.
Lemuel W. Serrell
Chas. H. Smith
Inventor:
Geo. Schott

UNITED STATES PATENT OFFICE.

GEORGE SCHOTT, OF NEW YORK, N. Y.

IMPROVED FEATHERS FOR BEDS.

Specification forming part of Letters Patent No. 44,223, dated September 13, 1864.

*To all whom it may concern:*

Be it known that I, GEORGE SCHOTT, of the city and State of New York, have invented and made a certain new and useful Improvement in Feathers for Beds, Mattresses, &c.; and I do hereby declare the following to be a full, clear, and exact description of the said invention.

In the manufacture of beds, pillows, bolsters, &c., it has heretofore been usual to employ only the small feathers and down from geese, &c., because if the feathers were large the bed or pillow would be uncomfortable, and such large feathers would become bent and liable to protrude through the ticking and injure the person. For these reasons nothing but good qualities of small feathers could be employed, and the demand for the same has greatly increased their price, so that good beds are too costly for most persons. At the same time the large chicken, turkey, and other feathers that are abundant and cheap have been thrown away.

My invention relates to a new article of manufacture, consisting of feathers cut up into short lengths, whereby I am enabled to employ large and common feathers—such as those from turkeys, chickens, &c.—and obtain a material for filling beds, mattresses, pillows, &c., that in use is scarcely discernable from the best geese feathers heretofore employed. Thus my article becomes a new and useful manufacture that is much cheaper than the articles heretofore employed, and materials heretofore nearly useless are profitably employed.

I find that the feathers can be cut up with the greatest facility when wet and compressed into a suitable trough and pressed or moved along in that trough so as to present them to the action of a rotary knife that passes across the end of such trough and cuts the feathers off in sections of the desired length—say from half an inch to two inches—according to the intended use. The feathers are afterward to be dried, and should be cured in an ordinary feather-dressing machine.

Any desired mechanism may be employed for cutting up the feathers, and they may be dry or only moist from steaming; but I prefer that they be wet when cut up.

It is important to confine the feathers thus cut up to a particular place in the bed or mattress. I therefore introduce divisions in such mattress, as shown in the annexed drawings, wherein—

Figure 1 is a sectional plan, and Fig. 2 is a cross-section.

*a a* represent the outer casing or ticking, and *b b* are the divisions or partitions of canvas or other suitable material sewed to the ticking. These partitions confine the cut-up feathers to their place and prevent their aggregation at parts where there is little pressure, as now usual in feather beds.

My new article of manufacture may be made from feathers of any description by cutting them up into short lengths, as aforesaid.

What I claim as new, and desire to secure by Letters Patent as a new article of manufacture for beds, mattresses, &c., is—

Feathers prepared in the manner set forth.

In witness whereof I have hereunto set my signature this 16th day of August, 1864.

GEO. SCHOTT.

Witnesses:
 LEMUEL W. SERRELL,
 CHAS. H. SMITH.